July 13, 1926.

E. VILLERS

SANITARY MILK PAIL

Filed Feb. 24, 1923

1,592,018

Inventor
Ernest Villers

Patented July 13, 1926.

1,592,018

UNITED STATES PATENT OFFICE.

ERNEST VILLERS, OF WADENA, MINNESOTA.

SANITARY MILK PAIL.

Application filed February 24, 1923. Serial No. 620,904.

This invention relates to a milk pail of improved construction and has for its object to provide a milk pail having a removable strainer capable of being readily removed or replaced whenever required.

An additional object is to provide an improved pail for use in milking and presenting an upper closed end having strainer means providing a cup-shaped depression into which the streams of milk can be readily directed during the milking operation.

Various other objects and advantages of the invention will become apparent from the following description.

Figure 1:
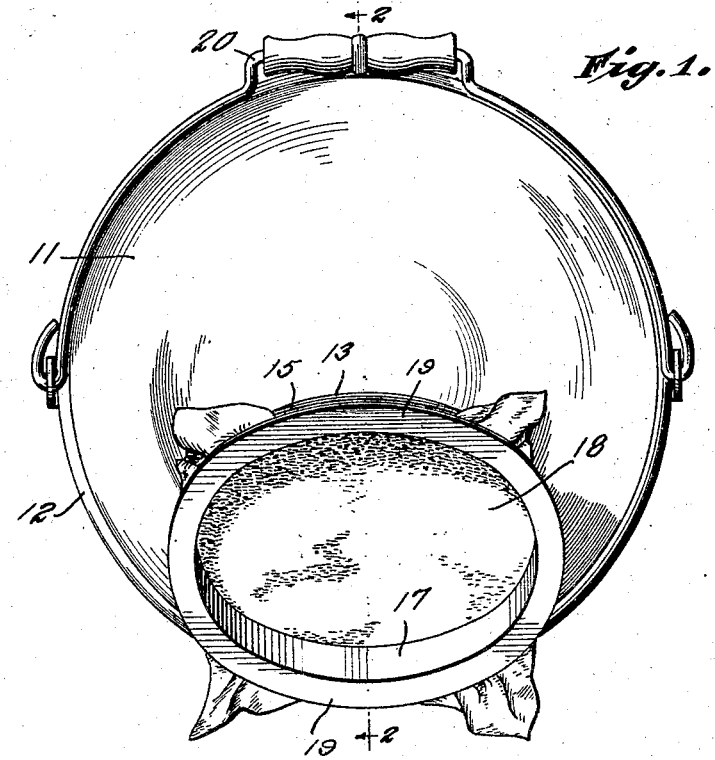
Figure 1 is a top plan view of the proposed milk pail.
Figure 2:
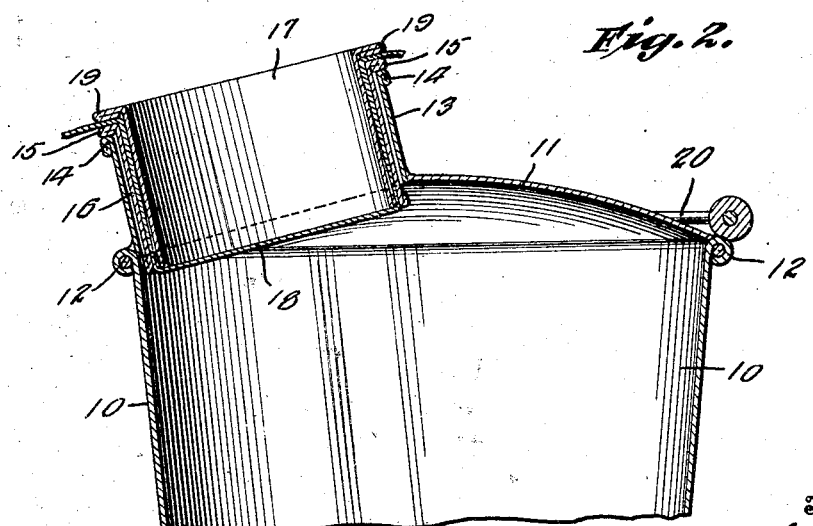
Figure 2 is a vertical section thru the upper portion thereof.

Describing the invention in detail, 10 designates the body of the pail or bucket which may be made of any suitable material and which is provided at its upper end with an outwardly flared cover or top 11 integrally connected with the pail as shown at 12. Adjacent one end of the pail the top 11 is provided with an upwardly inclined neck extension 13 having a roller edge or bead 14 around its upper edge to provide a suitable supporting shoulder for the supporting flange 15 of a collar 16. Telescoped within collar 16 is a retaining sleeve or inner collar 17 which serves to clamp the straining cloth 18, in place, as illustrated the straining cloth is arranged between the inner and outer collar members in a manner shown in Figure 2 and provides a bottom for the cup shaped receptacle thus formed by the interfitting parts, the upper edge of the cloth being clamped between the retaining flanges 15 and 19 of the inner and outer collars respectively.

The pail is provided with a suitable bail or handle 20 and when used for milking, the streams of milk are directed into the cup-shape depression and strained thru cloth 18, the latter serving to prevent the entrance of any foreign substance into the can and thus serving to keep the milk clean and wholesome. This straining cloth may be renewed at any time by merely removing the clamping ring 17 from the collar 16 and then rearranging the new cloth in place between the parts as will be understood from the drawing.

From the foregoing description it is thought that the advantages and novel features of the invention will become apparent and that further detail description is not required.

What is claimed is:

A milk strainer comprising a cylindrical member open at opposite ends and having its upper end bent outwardly and then inwardly upon itself to provide a flat circumferential flange projecting laterally thereof, a smaller cylindrical member fitting within the first-mentioned member and being also opened at its opposite ends, said smaller cylindrical member being removable and having its upper end bent outwardly and then inwardly upon itself to provide a flat laterally projecting flange adapted to project over upon and be supported by a flat flange of the first-mentioned member, and a straining cloth arranged between the said members with its upper portion clamped between the said flat flanges of the members and its lower portion bridging the bottom opening of the said inner member.

In testimony whereof I affix my signature.

ERNEST VILLERS.